Aug. 6, 1935.  M. C. SCHWAB  2,010,417
LIQUID FLOW APPARATUS
Filed Nov. 17, 1933  4 Sheets-Sheet 3

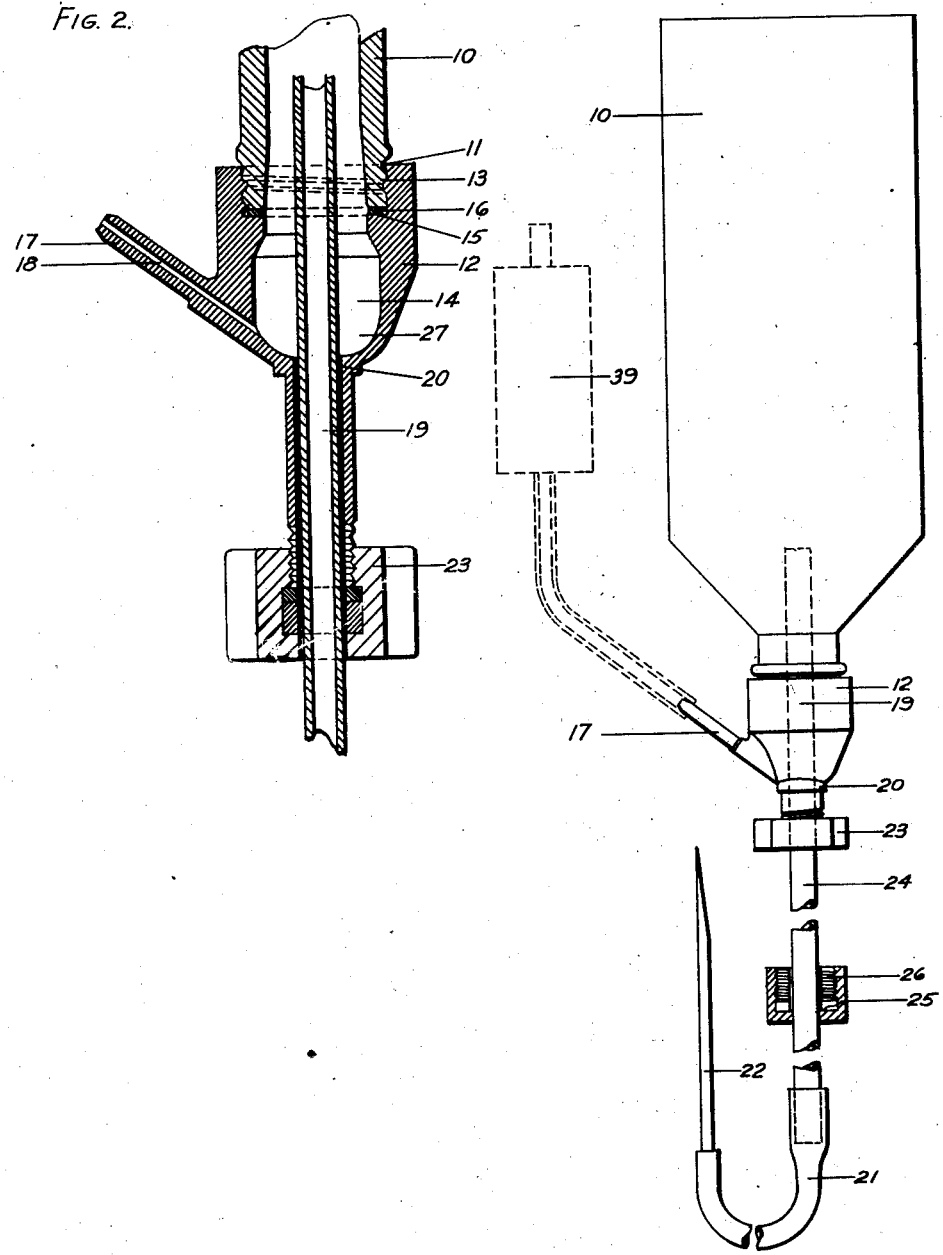

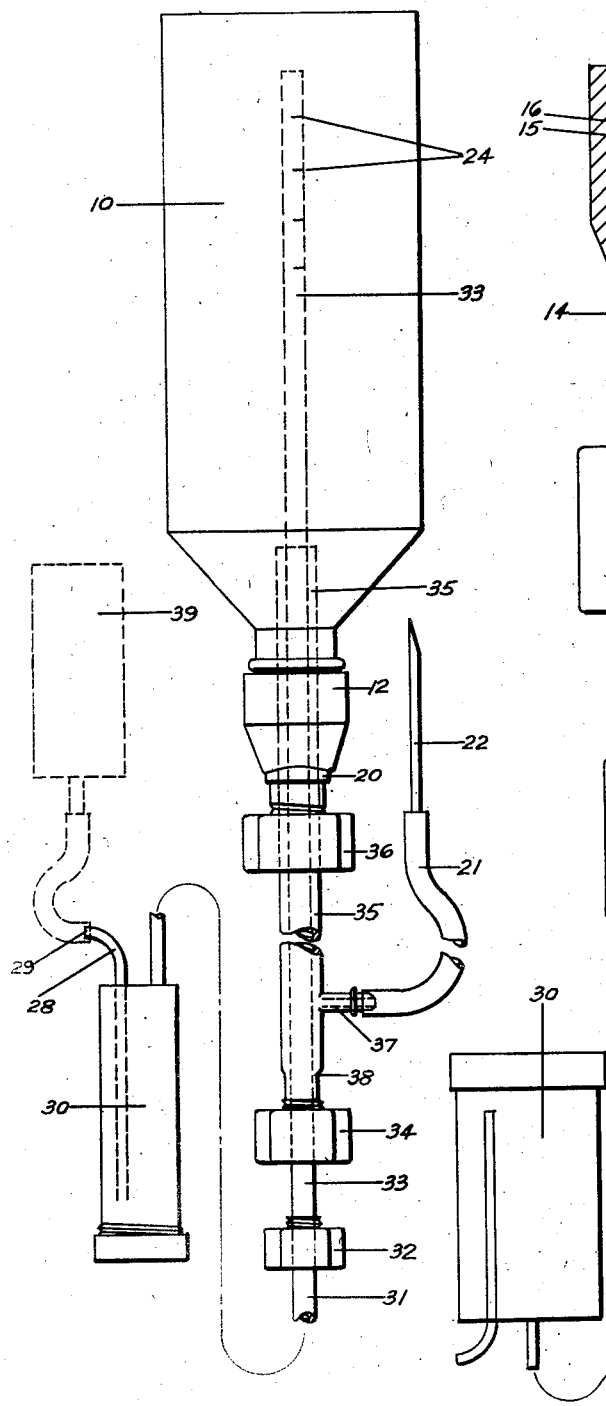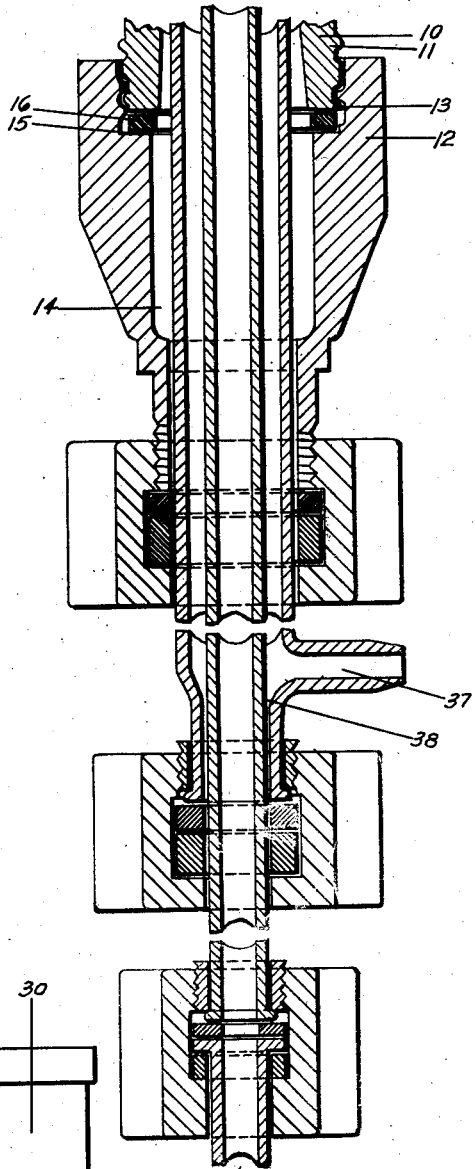

INVENTOR
MARTIN C. SCHWAB
BY James R. McKnight
ATTY.

Aug. 6, 1935.　　　M. C. SCHWAB　　　2,010,417
LIQUID FLOW APPARATUS
Filed Nov. 17, 1933　　4 Sheets-Sheet 4
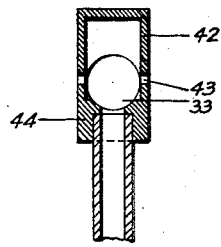
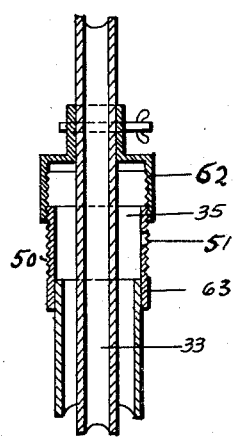
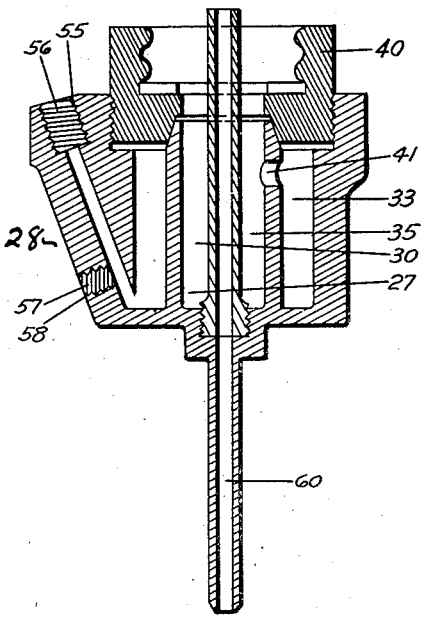
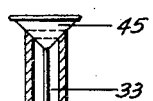
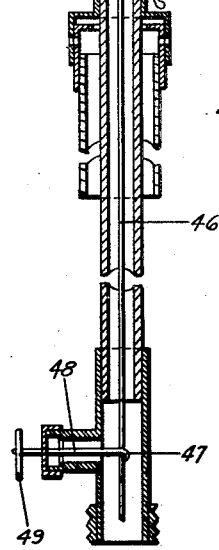
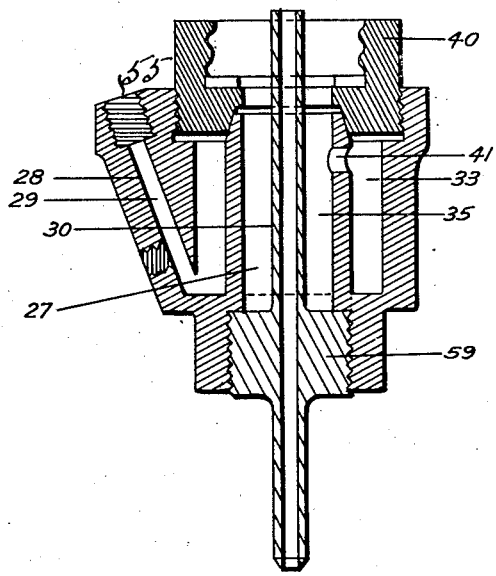
INVENTOR
MARTIN C. SCHWAB
BY James R. McKnight
ATTY.

Patented Aug. 6, 1935

2,010,417

UNITED STATES PATENT OFFICE 2,010,417

LIQUID FLOW APPARATUS

Martin C. Schwab, Chicago, Ill.

Application November 17, 1933, Serial No. 698,544

16 Claims. (Cl. 128—214)

My invention relates to liquid flow apparatus as hereinafter set forth.

Where apparatus is used to withdraw liquid from a container it has been customary to use the entire contents of the container. It is a well known fact that foreign bodies and other impurities tend to sink toward the bottom and outlet of the container. Naturally these impurities will flow out with the liquid and may cause serious results. This commercial apparatus is also applicable for efficient handling of liquids in laboratories, hospitals and other places where medication is provided free from foreign bodies and contamination.

Among the objects of my invention are to provide a trap so that this bottom portion of the liquid will impound these foreign bodies in suspension and will never be drained off. My structure at the same time that it provides this trap will also act as a measuring device adjustable as to amount permitting the pouring off of a predetermined measure of liquid. My structure also supplies pure air or gas free from foreign bodies to break the vacuum in a container; provides a liquid trap for washing the air or gas that passes from the atmosphere, or gas supply, to the container; creates adjustable air and liquid tubes; provides means for supplying air to break vacuum in container above liquid level; supplies a sediment chamber for impounding foreign bodies; allows extensions for the liquid flow means; provides air, gas and liquid tubes with valve means operable from without the container; creates liquid trap means for impounding such foreign bodies in the air or gas, and such other objects, advantages and capabilities as will later more fully appear and which are inherently possessed by my invention.

While I have suggested herein preferred embodiments of my invention yet I wish it understood that the same are susceptible of modification and change without departing from the spirit of my invention.

Figure 5:
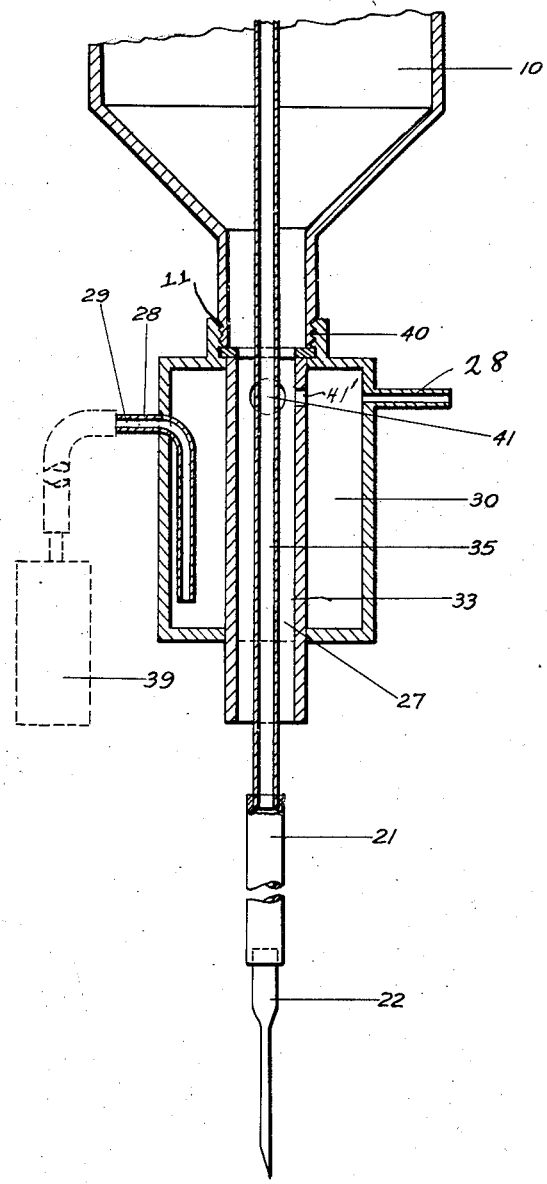
Figure 6:
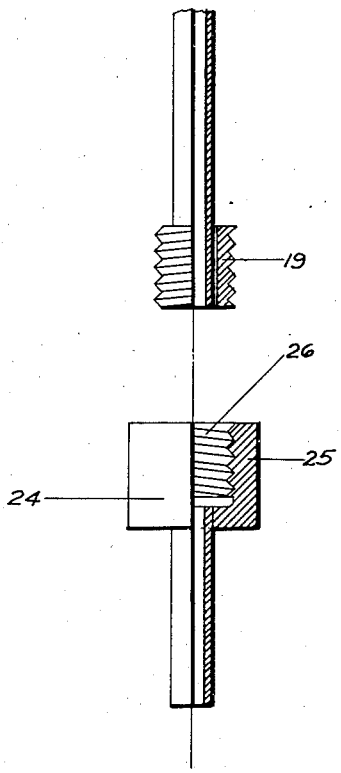

Referring more particularly to the drawings: Fig. 1 is a sectional view of one embodiment of my invention and Fig. 2 a more detailed view of the same embodiment; Figs. 3, 4 and 5 are sectional views of other embodiments of my invention; Fig. 6 is a detailed view of the extensions; Figs. 7, 8, 9 and 10 are detailed views of valve means; and Figs. 11 and 12 are detailed views of an embodiment.

In the embodiment selected to illustrate my invention in Figs. 1 and 2, a container 10 having screw threads 11 is joined to a connecting member 12, said screw threads 11 meeting screw threads 13 on the connecting member 12. Any other suitable engaging means may, of course, be employed. My connecting member 12 has a well 14, and inside near the top a seat 15 for holding a washer 16. This seat 15 and washer 16 act to relieve the weight of the container 10 on the screw threads 11 and 13. At one side of said connecting member 12 is a boss 17 having an air passage way 18 leading into the well 14. A liquid flow tube 19 passes through an opening 20 at the bottom of the connecting member 12 and has attached to its lower end a hollow carrying member 21 which in turn is connected to a feeding or dispensing member 22. The liquid flow tube 19 extends upwardly and into the container 10 a desired distance and is held in fixed position by means of an adjustable packing nut 23 or other suitable adjustable holding means. I provide the liquid flow tube 19 with markings 24 which indicate the amount of liquid to be withdrawn when each marking is reached. By loosening the adjustable packing nut 23 the liquid flow tube may be moved as far up in the container 10 as desired. The farther up in the container the liquid flow tube 19 is inserted, the less will be the amount of liquid withdrawn because when the liquid level is below the mouth of the liquid flow tube 19 it cannot be drawn out. I may also use a liquid flow tube 19 to which may be joined extensions 25 by screw threads 26, friction or any suitable means. The extensions 25 also have markings 24 to indicate the amount of liquid their use will permit to be withdrawn. The extensions 25 may also be of varied diameters as shown in Fig. 6.

For purposes of illustration let us assume the use of the above embodiment for an intravenous injection. The container 10 contains a supply of liquid. A certain quantity of the liquid is to be injected into the patient. The adjusting nut 23 is loosened and the liquid flow tube 19 is moved upwardly in the container to the point where one of the markings 24 indicates that the desired amount has been reached. The needle 22 is then placed in the patient and the apparatus is ready for operation. Air, or gas from a gas supply 39, comes in through air passage way 18 down into well 14 and up into container 10 where it breaks the vacuum in the container 10 and permits the liquid to flow downwardly in liquid flow tube 19 into carrying member 21 to needle 22 and thus into the body of the patient. The flow continues until the liquid has gone below the top of liquid flow tube 19. My apparatus therefore acts both as a measuring device for the withdrawal of a predetermined amount of liquid and also as a liquid trap. When the liquid has reached a level below the mouth of the liquid flow tube 19 it has no place to go and must remain in the container 10. This forms a liquid trap and all foreign bodies or dirt are impounded in this liquid. Since all of the liquid that was active and moving has poured out through liquid flow tube 19, the liquid lying in the trap has remained quiet since it is below the point of disturbance. It, therefore, holds in suspension any foreign bodies that have fallen into the liquid. Naturally, comparatively all particles such as glass, or other foreign matter, will fall to the bottom and will be lodged in the liquid trap at the bottom of the well 14 which may be termed a sediment chamber 27. This liquid in the sediment chamber 27 can never be drained off to reach the patient.

In the embodiment selected to illustrate my invention in Figs. 3 and 4 the container 10 having screw threads 11 is joined to a connecting member 12, said screw threads 11 meeting screw threads 13 of the connecting member 12. Any other suitable engaging means may, of course, be employed. My connecting member 12 has a hollow portion 14 and inside near the top a seat 15 for holding a washer 16. This seat 15 and washer 16 act to relieve the weight of the container 10 on the screw threads 11 and 13. An air, or gas, receiving tube 28 having an air, or gas, passage way 29 leads from the atmosphere, or a gas supply 39, down into wash tube 30 which is filled, or partly filled, with liquid. Extending upwardly from the wash tube 30 is an air, or gas, conduit 31 held in position by a packing nut 32. By unloosening nut 32, conduit 31 may be detached. Continuing upwardly from packing nut 32 is air inlet tube 33 which extends up into packing nut 34 wherein air inlet tube 33 is surrounded by larger liquid flow tube 35. Air inlet tube 33 surrounded by liquid flow tube 35 continues upwardly to packing nut 36; thence upwardly into the bottom 20 of connecting member 12; through connecting member 12 and into container 10. Air inlet tube 33 may be adjusted by manipulation of packing nut 34 and the height of liquid flow tube 35 may be determined by adjustment of packing nut 36. It is understood that wherever a gas supply is substituted for the atmosphere, gas may be substituted in the above description for air. Air inlet tube 33 may also have extensions such as 25 joined by screw threads 26 to the inlet tube 33 or other extensions 25. Said extensions 25 may also be of varied diameters.

As shown in Figs. 3 and 4 my structure will operate as follows:

In the container 10 containing liquid, the liquid will not begin to pour until the vacuum in the container is broken. Through the air receiving member 29 air comes from the atmosphere, or from the gas supply, into wash tube 30 where the air is washed and foreign bodies held in the liquid. The air then goes up through air conduit 31 and air inlet tube 33 through connecting member 12 up to near the top of container 10. The air discharges at this point so that the liquid is forced down through the liquid flow tube 35 which surrounds air inlet tube 33. The liquid passes down to a point above packing nut 34 where it passes out through liquid outlet tube 37. I may, of course, provide for a plurality of liquid outlet tubes 37.

It will be seen in Fig. 3 that the air inlet tube 33 has been adjusted so that it discharges near the top of the liquid. There is, therefore, no turbulence in the liquid because the air explosions are above the liquid. Furthermore, the entering air does not come in contact with the liquid to be dispensed at all except at the very top. It does not mix up foreign bodies in the liquid as it might if it passed through the liquid. If there should be any foreign bodies which have passed through the liquid trap provided in wash tube 30 these foreign bodies will drop through the liquid flow tube 35 past the liquid outlet tube 37 and down into sediment chamber 38.

Another embodiment as shown in Fig. 5 discloses a container 10 having screw threads 11 joined to the screw threaded cap 40 of a wash tube 30. An air, or gas, inlet tube 33 extends from the bottom of said wash tube 30 to the container 10. Within said air, or gas, inlet tube 33 is a liquid flow tube 35 which extends from a desired point within the container 10 and at its other end to a hollow tubing 21 and dispensing member 22. An air, or gas, receiving tube 28 extends outwardly at either side of said wash tube 30 to the atmosphere, or a gas supply 39. The air, or gas, enters the receiving tube 28 which tube extends downwardly towards the bottom of the wash tube 30 where the air, or gas, passes into the liquid in the wash tube 30. The air, or gas, passes through the liquid and leaves foreign matter and other bodies in suspension in the liquid. The air or gas then passes upwardly through the liquid to an opening 41' in the inlet tube 33 and thence through opening 41 in the liquid flow tube 35 upwardly into the container 10 where it breaks the vacuum and allows the liquid to flow through the liquid flow tube 35 to the dispensing member 22. Said inlet tube 33 and said liquid flow tube 35 are adjustable with reference to each other so that the height of tube 35 may be varied within the container 10.

The lowermost portion of the inlet tube 33 in this view may be provided with a packing assembly surrounding the liquid flow tube 35 and such packing as the packing member 23, shown in Figures 1 and 2, may be readily used, as will be apparent and understood.

I may find it desirable to have more than one opening 41 and place them as desired both for allowing liquid to flow from the container 10 to the air inlet tube and thence through opening 41' to the wash tube 30 and to allow air, or gas, to enter the container 10. I may also find it desirable to have more than one receiving tube 28 as shown at the right corner of Fig. 5.

I find it desirable in some instances to use valve means to control the operation of my structure and to close both or either the air, or gas, inlet tube 33 and the liquid flow tube 35 as shown more specifically in Figures 7 to 10. Wherever the air inlet tube (applicant intends to include gas also wherever air is mentioned) extends beyond the liquid flow tube I may use the following valve means:

I surround the top opening of the inlet tube 33 by a cage 42 within which is placed a ball 43. The ball 43 is of such a size and weight as to normally rest on the opening of the inlet tube 33. To prevent breakage of the top of the inlet tube 33 I provide a seat 44 to help support the weight of the ball 43. When the structure is ready for operation the air passing up into the inlet tube 33 will automatically force the ball 43 off the opening where it will remain until the air ceases to come through the inlet tube. The cage 42 prevents the ball from falling into the container 10. When the air flow is stopped the ball 43 will drop by its weight down against the opening of an inlet tube 33 and seal the same.

Another form of valve means for the air inlet tube 33 comprises a stopper 45 which is conical in shape and has its pointed end normally fitting down into and closing the top opening of the inlet tube 33. This stopper 45 is connected by a rod 46 which extends down through the inlet tube 33 to a cam 47 which in turn is connected to a bar 48 which is operated by a handle 49. By operation of the handle 49 the bar 48 will turn the cam 47 which will raise the rod 46 and push the stopper 45 free from the opening of inlet tube 33. A reverse turn of the handle 49 will reverse the cam and pull down the rod so as to seal the opening of inlet tube 33.

I may also use this form of valve on a liquid flow tube where the liquid flow tube extends above the air inlet tube or at a point where it is not surrounded or within the air inlet tube.

Where the liquid flow tube 35 surrounds the air inlet tube 33, as shown in Fig. 9, a screw threaded upper ferrule 62 is fixed to the air inlet tube 33. Below said upper ferrule 62 screw threaded lower ferrule 50 is attached to said liquid flow tube 35 so as to leave an opening 51 for the admission of liquid from the container 10 into liquid flow tube 35. When it is desired to close this opening 51 either air inlet tube 33 or liquid flow tube 35 may be rotated until the opening 51 is closed and liquid flow tube 35 is sealed so as to prevent the admission of liquid thereinto.

A different embodiment shown in Fig. 10 comprises a valve structure in which the upper seat 52 of the valve is fixed to the air inlet tube 33 and the lower seat 53 of the valve is secured to the liquid flow tube 35. Both the upper and lower seats 52 and 53 have a plurality of holes 54. When it is desired that the structure operate the air inlet tube 33 is rotated until the holes 54 in the upper and lower seats 52 and 53 are opposite each other. It is apparent that all of my valve structures are operable from without the container and that they may be closed or opened without ever disturbing the liquid within.

In the embodiments of Figures 7 to 10, the packing and dispensing connections and the connections of the container 10 have not been illustrated as it will be readily understood that these details are supplied by the other views and may be utilized to complete the assemblies with these constructional features.

As a variation to the embodiment shown in Fig. 5, I may provide, as shown in Fig. 11, that the air, or gas, receiving tube 28 be integral with the wash tube 30 and extend from the atmosphere, or gas supply, 39, diagonally towards the bottom of wash tube 30. I may also provide a screw threaded closure 55 for the opening 56 of the receiving tube 28, and also another screw threaded closure 57 for an opening 58 adjacent the bottom of receiving tube 28. In Fig. 11 it will be noticed that the liquid flow tube withdraws the entire contents of the container except that in the wash tube 30 unless it is provided with a removable liquid flow tube extenson 60. The position of the liquid flow tube is fixed and is not adjustable. Neither is there any provision for an adjustable air inlet tube. Fig. 12 shows the bottom 59 of the wash tube screw threaded to receive a stuffing box through which may pass adjustable liquid flow tube and air tube. When the adjustable liquid flow tube is used it may be positioned at any point within the container. Likewise when an adjustable air inlet tube is used. In this case the air receiving tube 28 may be shut with closure 55.

Having thus described my invention I claim:

1. In a liquid flow apparatus for the administration of fluids, of the character herein described, the combination with a container having liquid to dispense and a dispensing member, an adjustable liquid flow tube leading from a desired point in the container to the dispensing member and an inlet tube within said liquid flow tube, said inlet tube being adjustable in relation to said flow tube and leading from a desired point in the container to the atmosphere or to a gas supply.

2. In combination with a container having liquid to dispense and a dispensing member, a liquid flow tube leading from the container to the dispensing member and an inlet tube within said liquid flow tube and leading from said container to the atmosphere, or to a gas supply, said liquid flow tube and said inlet tube both being adjustable with relation to each other so that either tube may be raised or lowered to any desired height in the container.

3. In a liquid flow apparatus for the administration of fluids of the character herein described, the combination with a container having liquid to dispense and a dispensing member, a cap removably fixed to said container, an adjustable liquid flow tube leading from a desired point in the container through said cap to the dispensing member and an adjustable inlet tube within said liquid flow tube said inlet tube being adjustable in relation to said flow tube and leading from a desired point in the container through said cap to the atmosphere, or to a gas supply.

4. In combination with a container having liquid to dispense and a dispensing member, a receiving tube leading from the atmosphere, or from a gas supply, to a wash tube containing liquid, an adjustable inlet tube leading from said wash tube to said container and an adjustable liquid flow tube surrounding said inlet tube and leading from said container to said dispensing member.

5. In combination with a container having liquid to dispense and a dispensing member, a cap removably fixed to said container, a receiving tube leading from the atmosphere, or from a gas supply, to a wash tube containing liquid, an adjustable inlet tube leading from said wash tube to said container through said cap and an adjustable liquid flow tube surrounding said inlet tube and leading from said container through said cap to said dispensing member.

6. In combination with a container having liquid to dispense and a dispensing member, an adjustable liquid flow tube inserted a desired distance within the container so as to draw off liquid above the mouth of said tube and leave the liquid lying below the mouth of said tube for holding foreign bodies held therein in suspension, said liquid flow tube leading to the dispensing member and an inlet tube within said liquid flow tube, said inlet tube leading from the atmosphere, or from a gas supply, to a point above the level of the liquid in the container so that the air, or gas, will not pass through the liquid.

7. In combination with a container having liquid to dispense and a dispensing member, an adjustable liquid flow tube leading from a desired point in the container to the dispensing member, an adjustable inlet tube within said liquid flow tube and leading from a desired point in the container to the atmosphere, or to a gas supply, and a sediment chamber wherein heavy foreign bodies may fall and be withheld from the dispensing member.

8. Liquid flow apparatus comprising an inverted container having liquid to dispense, a dispensing member, a hollow cap removably connected to the open end of said container, said cap having a boss with an upwardly and outwardly directed passageway, said passageway leading from the atmosphere, or from a gas supply, to the hollow interior of said cap, a liquid flow tube leading through an opening in the bottom of said cap to a desired point within the container so that liquid in said cap acts as an impounder of foreign bodies and cannot be withdrawn, said liquid flow tube leading at its other end to the dispensing member.

9. In combination with a container having liquid to dispense and a dispensing member, a receiving tube leading from the atmosphere, or from a gas supply, to a wash tube containing liquid, an adjustable liquid flow tube leading from a desired point in the container to the dispensing member and an adjustable inlet tube surrounding a portion of said liquid tube and leading from said wash tube to said container said inlet tube having an opening within said wash tube for receiving the air, or gas, from the wash tube and thence passing the same through an opening in the liquid flow tube to the container.

10. In combination with a container having liquid to dispense and a dispensing member, a receiving tube leading from the atmosphere, or from a gas supply, to a wash tube containing liquid, an adjustable liquid flow tube leading from the container to the dispensing member, an adjustable inlet tube surrounding a portion of said liquid flow tube and within said wash tube, said inlet tube leading to said container and having an opening at a point within said wash tube so that air, or gas, will pass from the wash tube into said inlet tube and thence through an opening in the liquid flow tube into said container.

11. In combination with a container having liquid to dispense and a dispensing member, a receiving tube leading from the atmosphere, or from a gas supply, to a wash tube containing liquid, said wash tube attached to said container, a liquid flow tube having an opening, said liquid flow tube leading from the container to the dispensing member, an inlet tube surrounding a portion of said liquid flow tube and within said wash tube, said inlet tube leading from said container and having an opening at a point within said wash tube for admitting air, or gas, and also for permitting liquid from the container to flow into said wash tube and act as a sediment chamber for foreign bodies.

12. Liquid flow apparatus comprising an inverted container having liquid to dispense a dispensing member, a liquid flow tube leading from the container to the dispensing member, an inlet tube leading from the atmosphere, or from a gas supply, to a desired point in the container, a stopper having a pointed end of sufficient size to normally fit down into the open end of said inlet tube and seal the same, said stopper connected to a rod, said rod operable by a handle through a cam to raise said stopper and expose the open end of said inlet tube.

13. Liquid flow apparatus comprising an inverted container having liquid to dispense, a dispensing member, a liquid flow tube leading from a desired point in the container to the dispensing member, an air, or gas inlet tube, a stopper having a pointer end of sufficient size to normally fit down into the open end of said liquid flow tube and seal the same, said stopper connected to a rod, said rod operable by a handle through a cam to raise said stopper and expose the open end of said liquid flow tube.

14. Liquid flow apparatus comprising a container having liquid to dispense, a dispensing member, a hollow cap removably attached to the open end of said container and having a central liquid passage communicating with said open end, and an air wash tube containing liquid surrounding said central liquid passage, said cap having a boss with a passageway leading from the atmosphere, or from a gas supply, to the bottom of said air wash tube, so that air, or gas, coming into said air wash tube leaves foreign bodies within said air wash tube as said air, or gas, passes upwardly and through an opening adjacent the top of the air wash tube into the central liquid passage.

15. Liquid flow apparatus comprising a container having liquid to dispense, a dispensing member, a hollow cap removably attached to the open end of said container and having a central liquid passage communicating with said open end, an adjustable liquid flow tube placed within said liquid passage and leading from a desired point in the container to the dispensing member, and an air wash tube containing liquid surrounding central liquid passage, said cap having a boss with a passageway leading from the atmosphere, or from a gas supply, to the bottom of said air wash tube, so that air, or gas, coming into said air wash tube leaves foreign bodies within said air wash tube as said air, or gas, passes upwardly and through an opening adjacent the top of the air wash tube into the central liquid passage.

16. In a liquid flow apparatus for the administration of fluids, of the character herein described, the combination with a container having liquid to dispense and a dispensing member for connection therewith for dispensing the liquid by inversion of the container as an unbroken column of fluid, a liquid flow tube leading from a desired point in the container to the dispensing member supplying a continuous column of liquid thereto, an inlet tube having one end extending within the container and adapted to be extended into the liquid of said container in the upright and the inverted positions of said container, the other end of the inlet tube leading to the atmosphere or to a gas supply, and a sediment chamber wherein heavy bodies may fall and be held from the dispensing member.

MARTIN C. SCHWAB.